2,819,257
ETHYLENE POLYMERIZATION

Fred Kagan, Kalamazoo, Mich., assignor to Standard Oil Company, Chicago, Ill., a corporation of Indiana No Drawing. Application November 20, 1953
Serial No. 393,487

16 Claims. (Cl. 260—94.9)

This invention relates to an improved process of polymerizing ethylene and has particular reference to a process for the preparation of normally solid polymers of ethylene. By normally solid polymers of ethylene is meant those polymers of ethylene which are capable of independent shape retention at 20° C. and atmospheric pressure. In one aspect, this invention relates to a process for the manufacture of polyethylenes having freezing or softening temperatures above about 100° C. and specific viscosities ($\times 10^{-5}$) above about 5000, but which may extend to 15,000, 25,000, 50,000, or even more.

In the polymerization of ethylene to normally solid polymers, an important and recurrent problem has been to provide means for the removal of the solid polyethylenes from the reaction vessels, especially in processes where ethylene is subjected to continuous or flow polymerization. Various solvents or carrier liquids have been proposed for use in such processes to prevent the accumulation of difficultly removable polymer in the polymerization reaction vessels and to carry the polymer from the reaction vessels to one or more separation zones. It was found, however, that the solvent media or carrier liquids adversely affected the polymerization reaction, sometimes entering into the reaction and adversely affecting the properties of the polymer (note, for example, U. S. P. 2,475,643). Pure water does not appear to enter into reaction with ethylene during the polymerization, but it has been found that the suspending capacity of water for normally solid polyethylenes is limited and it is difficult to attain long, continuous ethylene polymerization operations in this medium. Only a few out of many organic compounds which were tested as reaction media for ethylene polymerization have proved to be useful. Sometimes the inutility of the various organic compounds was due to undesirable physical properties, for example, relatively high melting point or very high boiling point, or tenacious retention by the solid polyethylene; sometimes it was due to undesirable chemical properties such as selective reaction with the catalyst or interaction with the growing polymer chain, and sometimes to factors which cannot be readily defined but which were reflected in decreased polymer yield, unsatisfactory suspending power for the solid polyethylenes or the like.

One object of my invention is to provide an improved process for the polymerization of ethylene in a liquid medium in which an easily recovered granular polymer is produced. Another object of my invention is to provide a novel reaction medium for ethylene polymerization which does not interfere with the course of the polymerization. Yet another object is to provide a reaction medium in which ethylene can be polymerized by contact with free radical-producing substances to yield solid polymers having commercially desirable characteristics, especially toughness and flexibility. A further object of my invention is to provide a liquid reaction medium for ethylene polymerization which is characterized by high suspending power for the solid polyethylenes and ease of separation from said solid polyethylenes. Yet another object of the invention is the provision of a liquid reaction medium for ethylene polymerization that can be separated from the ethylene polymer without substantial alteration of the medium, so that it can be recycled to the reaction zone. The invention has for further objects such other advantages or results as will be found in the specification and in the claims hereinafter made.

I have found that the foregoing objects can be accomplished by contacting ethylene and a free radical-producing substance under polymerization conditions of temperature, pressure, time, etc. with a liquid reaction medium which consists essentially of dimethylneopentylcarbinol. The relative quantity of dimethylneopentylcarbinol can vary widely from about 10% to about 200% by weight of reactant ethylene and even higher quantities of the reaction medium can be used without seriously interfering with the polymerization reaction. It is preferred to employ quantities of dimethylneopentylcarbinol within the range of about 20% to about 150% of the reactant ethylene, within which preferred range 50% or more will more generally effect an easy removal of product from a reactor. The dimethylneopentylcarbinol provides a medium in which ethylene is readily polymerized in the presence of a catalyst of the above-mentioned type to form polyethylenes yielding tough and flexible films and having a specific viscosity of at least about $5000 \times 10^{-5}$; this latter value is proportional to the molecular weight and is an indication of product suitability. By the term "specific viscosity" I mean (relative viscosity—1) wherein relative viscosity is the ratio of the time of efflux of a solution of 0.125 g. of polymer in 100 cc. of C. P. xylenes at 110° C. from a viscosimeter to the time of efflux of 100 cc. of C. P. xylenes at the same temperature.

Dimethylneopentylcarbinol can be readily prepared by the addition of hydrogen chloride to diisobutylene (2,4,4-trimethylpentene-1-2) in the presence of a Friedel-Crafts metal halide such as $FeCl_3$ and hydrolysis of the resultant octyl chloride, by reaction of methyl magnesium chloride with methyl neopentyl ketone and by other methods (note F. C. Whitmore et al., J. Am. Chem. Soc. 63, 204 (1941); J. J. Ritter, J. Am. Chem. Soc. 70, 4253 (1948)). The dimethylneopentylcarbinol which was employed in the specific examples set forth hereinafter boiled at 143° C. and its refractive index ($n_D^{20}$) was 1.4233.

Dimethylneopentylcarbinol is preferably employed in substantially pure or concentrated form, and it is particularly desirable to remove substantially all of the oxygen from the medium before it is used.

Small quantities, less than 5% by volume, of liquid hydrocarbons or tertiary alcohols such as t-butyl alcohol or t-amyl alcohol, can be admixed with dimethylneopentylcarbinol particularly if a modification of the product is sought and if higher pressures within the disclosed range are employed.

Dimethylneopentylcarbinol has proved to be a liquid reaction medium and carrier liquid in which polyethylene forms in granules or similar small sized discrete shapes that can be readily separated from the remainder of the reaction mixture.

The dimethylneopentylcarbinol appears to function both as a reaction medium or carrier liquid and as a guide in directing polymerization and governing chain length. A particularly surprising aspect of my invention is the fact that the use of dimethylneopentylcarbinol provides a high yield and high quality, tough, flexible ethylene polymer in a form which can be readily removed from the polymerization reactor, whereas the use of similar compounds results in low yields of brittle, less valuable polymer which is extremely difficult to remove from the polymerization reactor.

In a continuous flow system, if the polymerization is effected at temperatures well above the softening temperature of the polymer, usually from about 100 to 175° C., the polymer will be carried out of the reactor as a solution in the reaction medium. The polymer will then be precipitated in a granular form upon cooling.

The ethylene charging stock that is employed in this process can be prepared by a variety of methods known in the art. Thus, ethylene may be obtained from petroleum refinery gas streams, e. g. streams derived from thermal or catalytic cracking processes, from high temperature cracking of propane, by catalytic dehydrogenation of ethane, by treatment of ethane-oxygen mixtures at high temperatures, by catalytic dehydration of ethanol and the like. The ethylene stream subjected to polymerization should be substantially free of oxygen and sulfur or their compounds, and free of nitrogen compounds. I prefer to employ ethylene charging stocks containing 10 parts by weight per million of molecular oxygen or less (when oxygen is not being employed as the polymerization catalyst), no sulfur or nitrogen compounds, and containing at most only small proportions of higher olefins such as propylene or butylenes. Molecular oxygen exerts a remarkable retardant effect upon peroxide polymerization catalysts such as peroxydicarbonate esters, to the extent, for example, that commercial cylinder ethylene containing in the neighborhood of 0.05 weight percent of molecular oxygen is unsuitable as a feed stock for the present polymerization process. Prior art processes for the removal of small amounts of oxygen from hydrocarbon gas streams may be employed for the purpose of deoxidizing the ethylene charging stock. By way of example the ethylene may be deoxidized after being compressed to 750 p. s. i. g. and heated to about 150° C. by passage through a column packed with grains of metallic copper. An alternative method of deoxidizing comprises contacting the ethylene, under desired pressure, with an alkali metal or an alkaline earth metal, for example molten sodium or a sodium-potassium alloy.

Propylene concentrations of the order of about 0.5 weight percent in the ethylene charging stock can be tolerated when the ethylene is to be polymerized to polyethylenes having a softening point above about 100° C., but it has been observed that higher concentrations of propylene, for example, about 5 percent or more in the ethylene charging stock, markedly reduce the softening point of the polymer which is produced by the process of the present invention. Propylene and higher olefins may be selectively removed from ethylene by adsorption, polymerization, alkylation, etc.

The charging stock employed in the process of this invention may contain saturated hydrocarbons such as ethane and propane, which exert a diluent effect by reducing the amount of ethylene in the polymerization zone, but do not exert any poisoning effect on the polymerization reaction.

The use of free radical-producing substances as initiators or catalysts for the polymerization of ethylene to form normally solid polymers is well known, having been described in numerous prior Letters Patent and other publications and does not per se constitute the present invention. Among the well known ethylene polymerization catalysts of the aforesaid type, I may employ, for example, oxygen or various inorganic peroxides such as persulfate, percarbonate, perborate and perchlorate salts of ammonia, the alkali metals and the alkaline earth metals; various other inorganic peroxides, including hydrogen peroxide and various reactive metal peroxides such as zinc peroxide, manganese dioxide and the like; organic peroxides, including various diacyl peroxides such as acetyl peroxide, benzoyl peroxide, lauroyl peroxide; peroxides derived from carboxylic acids, for example, peracetic acid, persuccinic acid, their esters and the like; dialkyl peroxides such as diethylperoxide, di-tert-butylperoxide and the like; ketone peroxides such as diacetone peroxide, methylethyl ketone peroxide, cyclohexanone peroxide and the like; alkyl and cycloalkyl hydroperoxides such as tert-butyl hydroperoxide, tetralin peroxide, pinane hydroperoxides, alpha-alpha'-dimethylbenzyl hydroperoxide or the like; various organic nitrogen compounds which are capable of producing free radicals at temperatures between about 20 and about 300° C. at a desirable rate, including diazo compounds, derivatives of hydrazine, various azines, oximes, amine oxides, and certain azo compounds; various reactive hydrocarbon derivatives of metals such as alkyl and aryl compounds of tin and lead; a miscellany of other free radical-producing substances such as the so-called "organic positive halogen compounds" (N-bromosuccinimide and the like), hexaphenylethane, hexachloroethane, etc.

Particularly desirable catalysts for employment in this invention include di-peroxydicarbonate esters having the formula

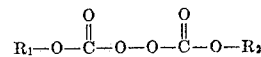

wherein $R_1$ and $R_2$ represent organic radicals, for example alkyl radicals such as methyl, ethyl, propyl, n-butyl, isobutyl, tert-butyl, amyl and the like, or different types of organic monovalent radicals (note, for example, U. S. P. 2,475,648).

Dialkyl peroxides having the formula $R_1OOR_2$, wherein $R_1$ and $R_2$ may be the same or different, are also especially desirable from the practical operating standpoint. A third class of free radical-producing substances which function extremely well as catalysts for the polymerization of ethylene to normally solid polymers are the alpha, alpha'-azo-bis-isoalkyl nitriles having the general formula

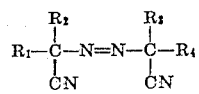

wherein $R_1$ and $R_4$ are alkyl groups and $R_2$ and $R_3$ are alkyl, cycloalkyl, or aryl groups. However $R_1$ and $R_2$ may be linked together as a carbocyclic ring, e. g. a cyclopentyl or cyclohexyl ring, and this applies likewise to $R_3$ and $R_4$.

The concentration of free radical catalysts employed in the polymerization reaction may, in general, be varied between about 0.001 and about 1% by weight, based on the weight of the ethylene charging stock, although more or less catalyst may be used, depending upon the specific operating conditions of time, temperature and pressure, solvent concentration, etc., the specific characteristics desired in the product polymer, the desired rate of reaction, etc., as will be apparent to one skilled in the art.

The free radical-producing substances, i. e., the free radical catalyst, which is selected should be capable of decomposing at a desirable rate at a temperature within the range of about 20° C. to about 300° C. to catalyze the polymerization of ethylene to form solid polymers. Specific decomposition temperatures or temperature ranges of various free radical-producing substances have been published, for example, in C. E. Schildknecht, "Vinyl and Related Polymers," John Wiley and Sons, Inc., N. Y., 1952, page 78. The present invention is not concerned with the specific temperature ranges for use with the various free radical catalysts since these are either well known in the art or can be readily determined by one skilled in the art through routine experimentation. I prefer to employ free radical catalysts which can be used in the temperature range of about 20 to about 300° C., preferably about 40° C. to about 200° C.

The ethylene polymerization pressure is selected in view of the other reaction variables and of the characteristics desired in the product. In general, increasing the partial pressure of ethylene in the reaction zone tends to increase the molecular weight of the polyethylene. A generally useful polymerization pressure range is between about 500 p. s. i. and about 30,000 p. s. i., although even higher pressures may be used. The more frequently used pressure range is between about 5000 and about 15,000 p. s. i.

When a di-peroxydicarbonate ester is employed as catalyst, ethylene polymerization employing the described charging stock and dimethylneopentylcarbinol as a liquid reaction medium is generally performed at temperatures between 20° C. and 100° C. and preferably between about 50° C. and 80° C., and at pressures within the range of about 500 to about 30,000 pounds and preferably between about 2,000 and 10,000 pounds per square inch gauge. Although a higher pressure can also be employed, extreme elevations in pressure have little effect on liquid phase polymerization. The organic peroxydicarbonate catalyst, which is preferably a dialkylperoxydicarbonate, is employed in amounts by weight based on ethylene of between 0.005 and about 1 percent. Depending upon the other reaction variables and upon the nature of the product desired, the polymerization period may vary from less than about one-quarter to about fifty hours. Generally, the reaction rate will not vary materially with small variations in pressure, the limiting rate apparently being the rate of solution of ethylene in the dimethylneopentylcarbinol. However, if the ethylene is introduced into the reaction zone as a solution of ethylene in dimethylneopentylcarbinol, increases in the partial pressure of ethylene within the disclosed range of 500 to 30,000 pounds and particularly within the range of 500 to 5,000 pounds per square inch may increase the rate of polymerization.

The dialkyl peroxides such as dimethyl, diethyl, di-n-propyl, diisopropyl, di-tertiary butyl, methyl tertiary butyl, ethyl tertiary butyl peroxides, and the like can be employed at temperatures within the range of about 60° C. to about 300° C. However, temperatures above 200° C. are employed only with the more stable members of the dialkyl peroxide series and/or at high ethylene pressures of about 15,000 p. s. i. or more. The alpha-alpha'-azo-bis-isoalkyl nitriles, and the corresponding cycloalkyl nitriles are usually employed at temperatures within the range of about 35° C. to about 150° C. It will be understood that it is well within the skill of the art to determine the optimum specific temperatures to employ with a given catalyst and a given objective in the way of product properties.

The reaction can be performed either continuously or batchwise. Continuous reaction vessels can contain tube bundles and provide conventional cooling means. The reactors should be stainless steel or some other corrosion resistant alloy. In a flow reactor, ethylene can be introduced in solution in the dimethylneopentylcarbinol or the compounds can be introduced separately. The solution is then caused to flow into contact with the catalyst which can, for example, be introduced in the dimethylneopentylcarbinol solution.

When reaction is completed, the effluent gas and liquid is flowed to a separator at somewhat below the reaction pressure, and ethylene is separated and can be recycled to the reactor or ethylene purification means. The resulting slurry of polyethylene and dimethylneopentylcarbinol is separated by filtration or spray drying; or the medium can be separated from the polymer by distillation, preferably under vacuum or by means of steam. The product obtained is free flowing and granular, exhibits a specific viscosity of greater than about $5,000 \times 10^{-5}$ and provides tough and flexible films.

A basis for comparing the subsequent specific examples of the invention is provided by an ethylene polymerization in which no solvent or liquid reaction medium or carrier liquid whatever was used. Ethylene which has been treated to remove impurities and to reduce its oxygen content to less than about 0.05 percent by weight of ethylene was polymerized at a temperature of 55° C., at an average pressure of 4,650 pounds per square inch gauge, and in the presence of 0.10 percent by weight of diethylperoxydicarbonate for a period of 4 hours. An 8% conversion of the ethylene was obtained and the product, which formed a tough and flexible polyethylene film, had a specific viscosity of $16,000 \times 10^{-5}$. However, the polymer was extremely difficult to remove from the reactor.

The following specific examples are presented to illustrate the present invention.

*Example 1*

A charge of 107 grams of a commercially available pure ethylene having only 17 parts per million of oxygen and an equal weight of dimethylneopentylcarbinol were introduced into a reactor and were heated at temperatures from 55° to 66° C., and under an average pressure of 5500 p. s. i. g. for 4 hours. The polymerization reaction was effected in the presence of 0.05% by weight, based on the ethylene, of diethylperoxydicarbonate as catalyst. A yield of 15.0 grams of polyethylene and a conversion of 14.0 percent based on ethylene were obtained. The polymer was easily removed from the reactor, formed tough and flexible film and exhibited a specific viscosity of $12,900 \times 10^{-5}$.

*Example 2*

A charge of 110 grams of ethylene having a reduced oxygen content of only 17 parts per million and an equal weight of dimethylneopentylcarbinol were introduced into a reactor and were heated at temperatures from 55° to 66° C. and under an average pressure of 6900 pounds per square inch gauge for 4 hours. The polymerization reaction was effected in the presence of 0.05% by weight, based on the ethylene, of diethylperoxydicarbonate as catalyst. A yield of 16.1 grams of polyethylene, and a conversion of 16.1 percent based on ethylene were obtained. The polymer was easily removed from the reactor. The polyethylene formed tough and flexible film and exhibited a specific viscosity of $14,500 \times 10^{-5}$.

*Example 3*

A 180 ml. stainless steel autoclave was charged with 75 ml. of dimethylneopentylcarbinol and with 0.03 g. of tertiary butylperoxide, evacuated and charged with 69 g. of purified ethylene (substantially free of oxygen, carbon dioxide and water). The reaction mixture was heated to 149° C. and stirred on a rocker apparatus, resulting in initial ethylene pressure of 8500 p. s. i. Reaction was continued for 3 hours to convert 32.6 w. percent of the ethylene into a flexible polymer having a specific viscosity$\times 10^{-5}$ of 6000, melt viscosity of $1.2 \times 10^3$ and density $$\frac{(24)}{4}$$

of 0.9211. The melt viscosity was determined by the method of Dienes and Klemm, J. Appl. Phys. 17, 458–71 (1946). The crystallization temperature of the polymer was found to be 107° C. by placing a sample of polymer between glass slides, heating on a Maquenne block to obtain clear, molten polymer and cooling slowly until a haze (due to crystal formation) appeared in the melt. The following technique of ethylene polymer separation from the reaction mixture was employed. The solid polymer, which was easily removed from the autoclave, was comminuted, washed with hexane, and filtered. The polymer was dried by treatment in a vacuum oven at 120° C. for 4 hours. The hexane washings were distilled to separate carbinol and a very small proportion of sludge, which was apparently solid polyethylene.

*Example 4*

The reaction vessel and operating technique were essentially the same as in Example 3. The reactor was charged as before with 75 ml. of dimethylneopentylcarbinol, 0.05 g. of alpha-alpha'-azo-bis-isobutyronitrile and with 69 g. of purified ethylene. Polymerization was effected at 100° C. and initial ethylene pressure of 8400 p. s. i. The reaction was continued for 3 hours to produce 25 w. percent, based on the ethylene charge, of solid polyethylenes which were very tough and flexible. The specific viscosity $\times 10^{-5}$ of the polymer was 6500, melt viscosity was $3 \times 10^3$ poises and density $$\frac{(24)}{4}$$

of 0.9309. The crystallization temperature of the polymer was 103° C.

The polyethylenes produced by the process of this invention can be subjected to such aftertreatment as may be selected, to fit them for particular uses or to impart desired properties. Thus the polyethylenes can be extruded, mechanically milled, or cast. Antioxidants, fillers, extenders, plasticizers, pigments, etc., can be incorporated in the polyethylenes.

This application is a continuation-in-part of my previous application, Serial No. 262,909, filed December 21, 1951, now abandoned.

Having thus described my invention, I claim:

1. A process which comprises passing ethylene into contact with a catalyst having the formula $$R_1-O-\overset{O}{\underset{\|}{C}}-O-O-\overset{O}{\underset{\|}{C}}-O-R_2$$

wherein $R_1$ and $R_2$ are alkyl radicals, and polymerizing the ethylene to form normally solid polymer in the presence of the catalyst and at least about 10 percent by weight based on the ethylene of an inert reaction medium consisting essentially of dimethylneopentylcarbinol at a polymerization temperature between about 20 and 100° C. and at a pressure between about 500 and about 30,000 pounds per square inch gauge.

2. The process of claim 1 in which dimethylneopentylcarbinol is between about 10 to 200 percent by weight of reactant ethylene.

3. The process of claim 1 in which the catalyst is a dialkylperoxydicarbonate and is present in an amount, based on the weight of the ethylene, of between about 0.005 and 1 percent.

4. A process of polymerizing ethylene which comprises introducing ethylene into a reaction zone under such pressure as to maintain therein an ethylene partial pressure between about 500 and 30,000 pounds per square inch gauge, introducing also into said zone between 20 and 150 percent by weight, based on the ethylene, of an inert reaction medium consisting essentially of dimethylneopentylcarbinol, effecting polymerization at a temperature between about 20° C. and 100° C. and in the presence of 0.005 and about 1 percent by weight, based on the ethylene, of a dialkylperoxydicarbonate and obtaining a slurry of product polymer and dimethylneopentylcarbinol, vaporizing the said carbinol and separating it from product polymer.

5. The process of claim 4 in which, subsequent to the polymerization reaction, the pressure is reduced thereby liberating unreacted ethylene from the reaction product, and the liberated ethylene is recycled.

6. The process of claim 4 in which dimethylneopentylcarbinol is distilled from the product and recycled to the reactor.

7. The process of polymerizing ethylene which comprises introducing ethylene into a reaction zone under such pressure as to maintain therein a partial pressure between about 500 and 30,000 p. s. i. g., introducing also into the said zone at least about 10 percent by weight based on the ethylene of an inert reaction medium consisting essentially of dimethylneopentylcarbinol, effecting polymerization at a temperature between about 20° and 100° C. in the presence of a catalyst having the formula $$R_1-O-\overset{O}{\underset{\|}{C}}-O-O-\overset{O}{\underset{\|}{C}}-O-R_2$$

wherein $R_1$ and $R_2$ are alkyl radicals, obtaining a slurry of product polymer and dimethylneopentylcarbinol, separating the polymer from the dimethylneopentylcarbinol, and recovering as product normally solid polyethylene.

8. In a process for the preparation of a normally solid polymer by contacting ethylene with a free radical-producing polymerization catalyst at a suitable temperature within the range of about 20° C. to about 300° C. at which said catalyst decomposes substantially to form free radicals and at a polymerization pressure of at least about 500 p. s. i. g. and sufficiently high to induce substantial polymerization, the step of effecting said contacting in the presence of an inert reaction medium consisting essentially of dimethylneopentylcarbinol in a proportion of at least about 10 weight percent, based on the ethylene.

9. The process of claim 8 wherein the proportion of dimethylneopentylcarbinol is between about 10 and about 200 weight percent, based on the weight of ethylene.

10. The process of claim 8 wherein said catalyst is an alpha-alpha'-azo-bis-isoalkyl nitrile.

11. The process of claim 10 wherein said nitrile is alpha-alpha'-azo-bis-isobutyronitrile.

12. The process of claim 8 wherein said catalyst is an organic peroxide.

13. The process of claim 8 wherein said catalyst is a dialkyl peroxide.

14. The process of claim 13 wherein said peroxide is di-tertiary butyl peroxide.

15. The process of claim 12 wherein said peroxide is a di-peroxydicarbonate ester.

16. In a process for the preparation of a normally solid polymer by contacting ethylene with a free radical-producing polymerization catalyst selected from the group consisting of a dialkyl peroxide, a di-peroxydicarbonate ester and an alpha-alpha'-azo-bis-isoalkyl nitrile, and effecting said contacting at a suitable temperature within the range of about 20° C. to about 300° C. at which said catalyst decomposes substantially to form free radicals and at a polymerization pressure of at least about 500 p. s. i. g. and sufficiently high to induce substantial polymerization, the step of effecting said contacting in the presence of an inert reaction medium consisting essentially of dimethylneopentylcarbinol in a proportion of at least about 10 weight percent, based on the ethylene.

References Cited in the file of this patent

UNITED STATES PATENTS

| | | |
|---|---|---|
| 2,405,962 | Larson | Aug. 20, 1946 |
| 2,728,753 | Russum et al. | Dec. 27, 1955 |